(12) United States Patent
Storey

(10) Patent No.: US 10,485,186 B2
(45) Date of Patent: *Nov. 26, 2019

(54) VERTICAL HYDROPONIC PLANT PRODUCTION APPARATUS

(71) Applicant: University of Wyoming, Laramie, WY (US)

(72) Inventor: Nathaniel R. Storey, Laramie, WY (US)

(73) Assignee: University of Wyoming, Laramie, WY (US)

( * ) Notice: Subject to any disclaimer, the term of this patent is extended or adjusted under 35 U.S.C. 154(b) by 76 days.

This patent is subject to a terminal disclaimer.

(21) Appl. No.: 15/582,165

(22) Filed: Apr. 28, 2017

(65) Prior Publication Data

US 2017/0231168 A1 Aug. 17, 2017

Related U.S. Application Data

(63) Continuation of application No. 15/284,688, filed on Oct. 4, 2016, which is a continuation of application No. 13/134,614, filed on Jun. 10, 2011, now Pat. No. 9,491,915, which is a continuation-in-part of application No. 12/804,931, filed on Aug. 2, 2010, now Pat. No. 8,327,582.

(60) Provisional application No. 61/273,317, filed on Aug. 3, 2009.

(51) Int. Cl.
*A01G 31/02* (2006.01)
*A01G 9/04* (2006.01)
*A01G 33/00* (2006.01)

(52) U.S. Cl.
CPC ............ *A01G 9/047* (2013.01); *A01G 31/02* (2013.01); *A01G 33/00* (2013.01); *Y02P 60/216* (2015.11)

(58) Field of Classification Search
CPC . A01G 9/00; A01G 9/02; A01G 9/022; A01G 9/025; A01G 9/1013; A01G 9/104; A01G 31/06; A01G 9/047; A01G 31/00; A01G 31/02
See application file for complete search history.

(56) References Cited

U.S. PATENT DOCUMENTS

| | | | |
|---|---|---|---|
| 2,152,869 | A | 4/1939 | Campbell |
| 2,292,619 | A | 8/1942 | De Smidt |
| 3,368,303 | A | 2/1968 | Duncan |
| 4,035,950 | A | 7/1977 | Anselm |
| 4,070,793 | A | 1/1978 | Dillon |
| 4,095,608 | A | 6/1978 | Holmes |

(Continued)

FOREIGN PATENT DOCUMENTS

| | | |
|---|---|---|
| GB | 2265536 | 6/1993 |
| GB | 2343829 | 5/2000 |

OTHER PUBLICATIONS

Australian Patent Office Search Report, (Application No. 201081721) dated Jul. 31, 2015.

(Continued)

*Primary Examiner* — Thanh Pham
(74) *Attorney, Agent, or Firm* — James M. Weatherly; Cochran Freund & Young LLC

(57) ABSTRACT

A growing medium for a plant production apparatus utilized in greenhouse crop production is provided. The growing medium comprises a fibrous, non-woven matrix media material wherein the media material is constructed from a plastic material.

27 Claims, 3 Drawing Sheets

(56) References Cited

U.S. PATENT DOCUMENTS

| | | | | |
|---|---|---|---|---|
| 4,175,355 A | * | 11/1979 | Dedolph | A01G 9/1006 47/64 |
| 4,268,994 A | * | 5/1981 | Urai | A01G 9/022 47/67 |
| 4,310,990 A | | 1/1982 | Payne | |
| 4,415,137 A | | 11/1983 | Garves | |
| 4,454,684 A | | 6/1984 | O'Hare | |
| 4,476,651 A | | 10/1984 | Drury | |
| 4,566,607 A | | 1/1986 | Smith | |
| 4,926,585 A | | 3/1990 | Dreschel | |
| 4,932,158 A | * | 6/1990 | Roberts | A01G 31/047 47/64 |
| 4,972,627 A | * | 11/1990 | Hori | A01G 5/06 47/64 |
| 5,097,627 A | | 3/1992 | Roberts | |
| 5,161,327 A | | 11/1992 | Campbell | |
| 5,293,713 A | | 3/1994 | Ahmed | |
| 5,363,594 A | * | 11/1994 | Davis | A01G 9/022 47/82 |
| 5,381,625 A | | 1/1995 | Vvente | |
| 5,490,374 A | | 2/1996 | Calende | |
| 5,555,676 A | | 9/1996 | Lund | |
| 5,987,812 A | | 11/1999 | Knell | |
| D420,554 S | | 2/2000 | Evans | |
| 6,615,542 B2 | | 9/2003 | Ware | |
| 6,727,091 B2 | * | 4/2004 | Darlington | B01D 53/85 435/292.1 |
| 6,751,903 B2 | | 6/2004 | Shryock | |
| 6,840,007 B2 | | 1/2005 | Leduc | |
| 6,840,008 B1 | | 1/2005 | Bullock | |
| 8,122,642 B1 | * | 2/2012 | Huberman | A01G 31/001 47/59 S |
| 8,327,582 B2 | | 12/2012 | Storey | |
| 9,380,751 B2 | | 7/2016 | Storey | |
| 9,491,915 B2 | | 11/2016 | Storey | |
| 2003/0052398 A1 | | 3/2003 | Utsumi | |
| 2003/0089037 A1 | | 5/2003 | Ware | |
| 2004/0103583 A1 | | 6/2004 | Eriksen | |
| 2004/0200148 A1 | | 10/2004 | Schuck | |
| 2005/0055878 A1 | * | 3/2005 | Dumont | A01G 31/047 47/62 R |
| 2005/0055879 A1 | | 3/2005 | Darlington | |
| 2006/0032128 A1 | | 2/2006 | Bryan | |
| 2006/0107589 A1 | | 5/2006 | Rubin | |
| 2006/0117656 A1 | | 6/2006 | Graham et al. | |
| 2006/0150485 A1 | | 7/2006 | Somerville | |
| 2006/0156624 A1 | | 7/2006 | Roy et al. | |
| 2006/0219853 A1 | | 10/2006 | Molina | |
| 2007/0062113 A1 | | 3/2007 | Rubin et al. | |
| 2007/0144069 A1 | | 6/2007 | Gottlieb | |
| 2007/0214717 A1 | | 9/2007 | Larwood | |
| 2008/0034653 A1 | | 2/2008 | Ramsey et al. | |
| 2008/0209804 A1 | | 9/2008 | Stradiot | |
| 2009/0056221 A1 | | 3/2009 | Ramsey et al. | |
| 2009/0288341 A1 | * | 11/2009 | Kania | A01G 9/00 47/64 |
| 2010/0313473 A1 | * | 12/2010 | Cussol | A01G 9/022 47/65.7 |
| 2011/0016782 A1 | | 1/2011 | Harder | |
| 2011/0232188 A1 | * | 9/2011 | Kennedy | A01G 24/00 47/59 S |
| 2011/0302837 A1 | * | 12/2011 | Chen | B32B 5/022 47/65.8 |
| 2014/0115960 A1 | | 5/2014 | Kantola | |
| 2015/0342127 A1 | | 12/2015 | Gallant | |

OTHER PUBLICATIONS

PCT Written Opinion and Search Report, (PCT/US2010/002157) dated Nov. 16, 2010.

European Patent Office Search Report, (Application No. 10806748.9) dated Apr. 21, 2015.

European Patent Office Action, (Application No. 10806748.9) dated Jul. 19, 2016.

Response to European Patent Office Action, (Application No. 10806748.9) dated Jan. 19, 2017.

European Patent Office Search Report, (Application No. 17195489.4) dated Feb. 28, 2018.

Office Action in corresponding U.S. Appl. No. 15/284,688 dated Oct. 4, 2017, 32 pages.

Response to Office Action in corresponding U.S. Appl. No. 15/284,688 dated Apr. 4, 2018, 44 pages.

Office Action in corresponding U.S. Appl. No. 15/581,765 dated Aug. 18, 2017, 21 pages.

Response to Office Action in corresponding U.S. Appl. No. 15/581,765 dated Nov. 15, 2017, 59 pages.

Final Office Action in corresponding U.S. Appl. No. 15/581,765 dated Jan. 25, 2018, 23 pages.

Response to Final Office Action in corresponding U.S. Appl. No. 15/581,765 dated Mar. 21, 2018, 28 pages.

Advisory Action & Interview summary in corresponding U.S. Appl. No. 15/581,765 dated Apr. 4, 2018, 7 pages.

Response to Advisory Action in corresponding U.S. Appl. No. 15/581,765 dated Apr. 25, 2018, 32 pages.

Intention to Grant, European Patent Office Application No. 17195489.4, dated Oct. 22, 2018.

Notice of Acceptance, Australian Patent Office, Application No. 201028721, dated May 12, 2016.

* cited by examiner

US 10,485,186 B2

VERTICAL HYDROPONIC PLANT PRODUCTION APPARATUS

CROSS REFERENCE TO RELATED APPLICATION

The present application is a continuation of pending patent application Ser. No. 15/284,688, filed Oct. 4, 2016, which is a continuation of U.S. Pat. No. 9,491,915, filed Jun. 10, 2011, which is a continuation-in-part of U.S. Pat. No. 8,327,582, filed Aug. 2, 2010, entitled "Vertical Hydroponic Plant Production Apparatus" which claims benefit of priority of provisional patent application Ser. No. 61/273,317, filed on Aug. 3, 2009, entitled "Vertical Hydroponic Plant Production Apparatus", the contents of which are all incorporated by reference.

BACKGROUND OF THE INVENTION

1. Field of the Invention

This invention relates generally to a vertical hydroponic plant production apparatus and, more particularly, the invention relates to a vertical hydroponic plant production apparatus utilizing fibrous, non-woven, air-laden media allowing for vertical hydroponic greenhouse crop production in a fraction of the space necessary for traditional plant production techniques and allowing utilization of vertical surfaces for plant production.

2. Description of the Prior Art

Traditional hydroponics has focused primarily on horizontal production techniques and has been subject to major space constraints. Vertical hydroponic applications have either been impractical, expensive to operate, or inefficient. Often these applications utilize some type of growth medium that is heavy when saturated, causing clogging when filled with plant roots, and/or requiring a great deal of maintenance. In addition, conventional technology makes it difficult to allow in-store display of live, growing vegetables and is not conducive to "you-pick" vegetable and herb sales to customers. Little technology exists that allows vertical plant displays that are highly scalable.

SUMMARY

The present invention is a growing medium for a plant production apparatus utilized in greenhouse crop production. The growing medium comprises a fibrous, non-woven matrix media material wherein the media material is constructed from a plastic material.

In addition, the present invention includes a method for growing plants in a plant production apparatus utilized in greenhouse crop production. The method comprises providing a fibrous, non-woven matrix media material and constructing the media material from a plastic material.

The present invention further includes a growing medium for a plant production apparatus utilized in greenhouse crop production. The growing medium comprises a fibrous, non-woven matrix media material and a silicone binder coating the media material for slowing decomposition and reducing UV damage. The media material is constructed from a plastic material and the media material has sufficient shear strength to be cut into strips and used in hydroponic environments and be free from tearing when pulled.

DETAILED DESCRIPTION OF THE PREFERRED EMBODIMENTS

Figure 1:
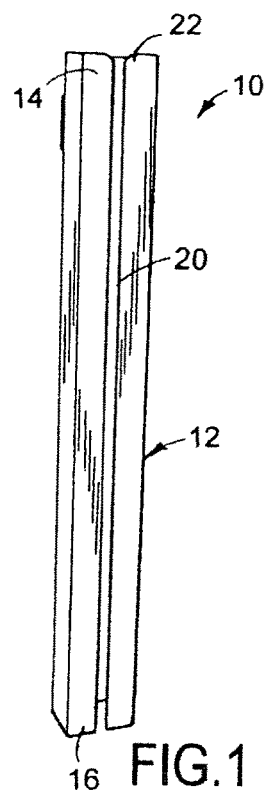
FIG. 1 is a front perspective view illustrating a grow tube of a vertical hydroponic plant production apparatus, constructed in accordance with the present invention.
Figure 2:
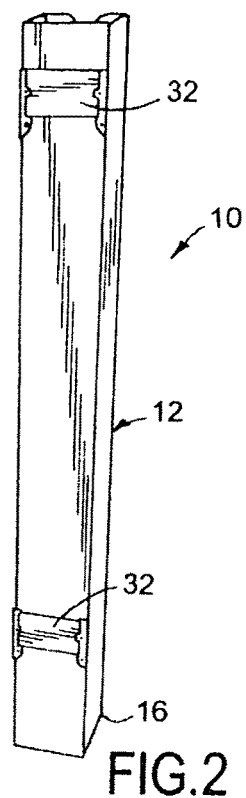
FIG. 2 is a rear perspective view illustrating the grow tube of the vertical hydroponic plant production apparatus of FIG. 1, constructed in accordance with the present invention.
Figure 3:
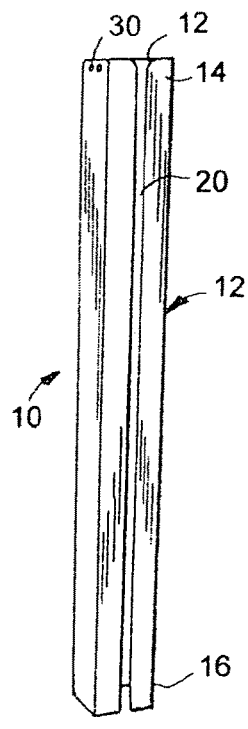
FIG. 3 is a front perspective view illustrating another embodiment of the grow tube of the vertical hydroponic plant production apparatus, constructed in accordance with the present invention.
Figure 4:
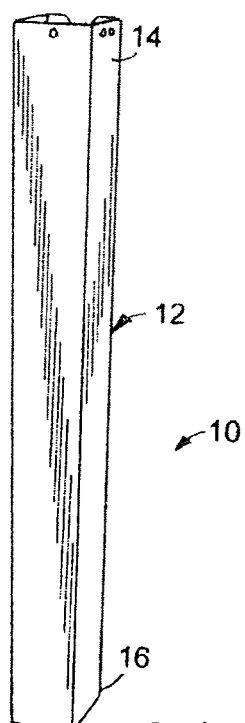
FIG. 4 is a rear perspective view illustrating the grow tube of the vertical hydroponic plant production apparatus of FIG. 3, constructed in accordance with the present invention.
Figure 5:
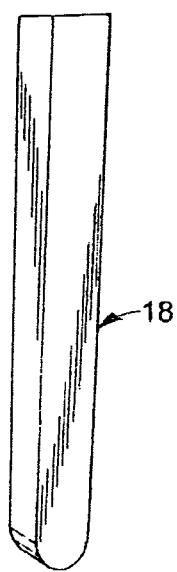
FIG. 5 is a front perspective view illustrating a media column of the vertical hydroponic plant production apparatus, constructed in accordance with the present invention.
Figure 6:
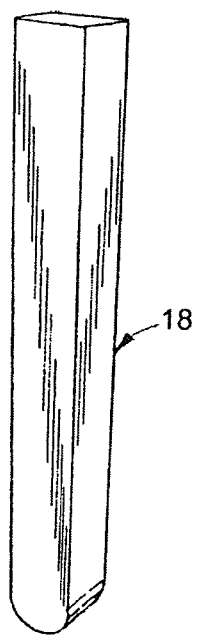
FIG. 6 is a rear perspective view illustrating the media column of the vertical hydroponic plant production apparatus of FIG. 5, constructed in accordance with the present invention.
Figure 7:
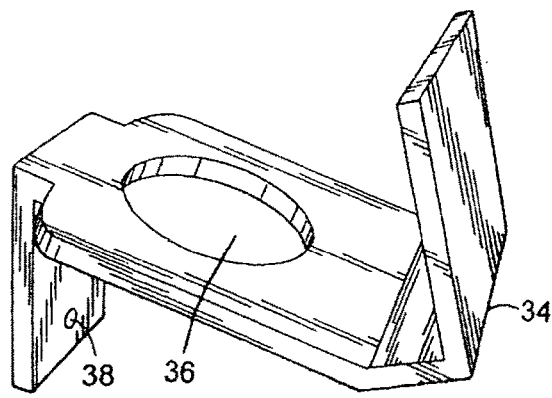
FIG. 7 is a perspective view illustrating a Z bracket of the vertical hydroponic plant production apparatus, constructed in accordance with the present invention.
Figure 8:
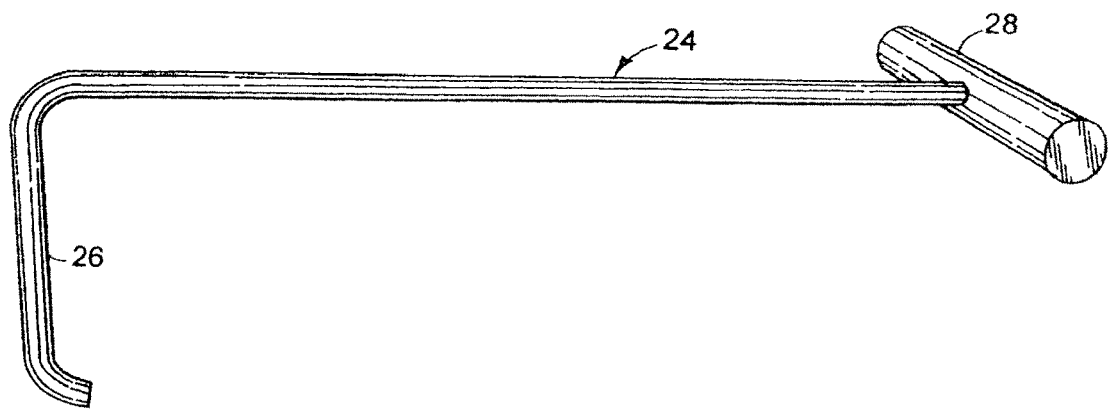
FIG. 8 is a perspective view illustrating a pulling hook of the vertical hydroponic plant production apparatus, constructed in accordance with the present invention.

As illustrated in FIGS. 1-8, the present invention is a vertical hydroponic plant production apparatus, indicated generally at 10, allowing vertical hydroponic greenhouse crop production in a fraction of the space necessary for traditional plant production techniques and allows utilization of vertical surfaces for plant production.

The vertical hydroponic plant production apparatus 10 of the present invention includes a grow tube 12 useable in a horizontal position, vertical position, or any position between the horizontal position and the vertical position. The grow tube 12 is highly portable, being light, making it easy to move the grow tube 12 from area to area for transplant, grow out, and harvest. The grow tube 12 further allows inclined, multi-angled crop production and multi-storied conveyor style crop production. The grow tube 12 of the vertical hydroponic plant production apparatus 10 of the present invention also functions as aquacultural biofiltration/nutrient stripping devices for plant-based, high-efficiency waste nutrient removal and as sites nitrification processes, having massive surface area/volume thereby reducing the costs of single pass aquaculture and improving the efficiency of recirculating aquaculture.

The grow tube or tower 12 of the vertical hydroponic plant production apparatus 10 of the present invention also functions as in-store or at market display devices allowing the display of fresh, live produce for you-pick vegetable sales at market places and allowing the sale of produce that is more fresh than traditionally harvested vegetable products. Designed for easy affixation to the walls and/or roofs of buildings, the grow tube 12 reduces heating and cooling costs through shading and plant evapotranspiration and performs a decorative function. The grow tube 12 applied in such a manner can also reduce rooftop and hard surface water runoff depending on application and plumbing system.

Basically, the vertical hydroponic plant production apparatus 10 of the present invention allows for decorative landscape designs as well as vertical plant production displays indoors for a variety of purposes. The grow tubes or towers 12 can house aromatic and decorative species of herbs that may be used for aromatherapy type interactive hallways, lobby displays, kitchen, and cafeteria displays as well as common industrial plant displays in offices and workspaces.

The grow tube 12 of the vertical hydroponic plant production apparatus 10 of the present invention has a first end 14 and a second end 16 and is preferably a square, triangular, or angular tubing containing a non-woven matrix media 18 composed of any number of plastic materials, suspended vertically from the ceiling, supported by a framework, and/or standing upright on the floor using a support pole or frame. The media 18 is preferably a fibrous, non-woven, air laid media made of polyethylene plastic, although it can also be made of any type of plastic. The media 18 can be coated with a silicone binder to slow decomposition and reduce UV damage and is characterized by its high surface area to volume ratio, high shear strength, and durable yet flexible structure. The media 18 functions as a mechanical filter media as well as substrate for biological filtration. Because of the high shear strength, the media 18, can be cut into strips and used in hydroponic environments where long strips are pulled and stressed without tearing. Crop seeds can be seeded directly into the media 18, or can be incorporated into the media 18 as seedlings a variety of ways. Seedlings can be inserted into holes cut in the media 18, between two or more pieces of media 18, or can be germinated beneath the media 18, with shoots protruding through the media 18. The media 18 can be used in raft hydroponics, as a media substrate for media based hydroponics or as a plant anchor in NFT hydroponics. The media 18 is an excellent substrate for root development and protection, biological interactions, and soil and substrate stabilization. Once used for plant production, the media 18 contains a great deal of organic matter and holds water quite well. At this point the material introduces a number of water and nutrient holding and moderation capabilities. The media 18 is also excellent for supporting redworm (*Eisenia fetida*) colonies as well as diverse colonies of soil bacteria and fungi. The media 18 can be used as a substrate for algae production as well.

Preferably, the grow tube 12 the vertical hydroponic plant production apparatus 10 of the present invention is constructed of a PVC plastic material with side walls having a width of approximately four (4") inches to six (6") inches although constructing the grow tube from a different material with different widths is within the scope of the present invention. The grow tube 12 has a slot 20 formed lengthwise through the grow tube 12. The slot 20 can be formed along the entire face of the grow tube 12 from the first end 14 to the second end 16 or the slot 20 can be formed to a point approximately four (4") inches to approximately six (6") inches from the first end 14 of the grow tube 12. In the case of the slot 20 formed along the entire face of the grow tube 12, the slot 20 can have angled portions 22 at the first end 14 of the grow tube 12 allowing for easy insertion and removal of the media, as will be described further below. Preferably, the slot 20 has a width of approximately one-half (½") inch to approximately one and one-half (1½") inches although constructing the slot 20 with different widths is within the scope of the present invention.

As mentioned briefly above, the vertical hydroponic plant production apparatus 10 of the present invention has a media material 18 preferably constructed from a polyester matrix material approximately two (2") inches thick, cut to the internal width/diameter of the grow tube, and folded in the middle so that both halves together roughly equal the inside dimensions of the grow tube or tower housing 12. The media material 18 can also be composed of two halves of approximately two (2") inch thick media or one piece of four (4") inch thick media split down the middle to within approximately four (4") inches to approximately six (6") inches of the top of the media material where a bolt spans its width. In the bolt embodiment of the present invention, this bolt not only spans the width of the media insert 18, joining the two halves, and/or lending structural integrity to the media insert, but also anchors a handle or receiver to the media 18, allowing either the handle to be grasped for the purposes of inserting and removing the media 18 insert from the grow tube 12, or allowing a forked or hooked handle to be inserted into the receiver for the same purpose.

In the embodiment of the vertical hydroponic plant production apparatus 10 of the present invention where the media material 18 is folded in half, a pulling hook 24 with a flat hook 26 attached to a handle 28 allows the media inserts 18 to be pulled into and out of the grow tube 12, with the pulling hook handle 28 extending from the slot 20 in the grow tube 12. The hook 24 preferably consists of a piece of round bar metal bent to form a broad, flat, "L" shaped hook, roughly the width of the folded media 18 with a handle 28 affixed to the end. The hook 26 can also be attached to a pneumatic or hydraulic device that allows automated "pulling" of the media inserts 18.

For planting, seedlings are placed between the two halves of media 18 of the vertical hydroponic plant production apparatus 10 of the present invention, with the upper portions out, and are "zipped" into the grow tubes 12 with the upper portions of the plant protruding through the gap in the tower housing 12. The top of the grow tube 12 can be capped with a removable cap having holes of variable sizes drilled in the center, or may not be capped at all. If capped, a mister or irrigation tubing is inserted through the hole in the cap hole. The bottom of the grow tube 12 is either submerged in nutrient solution, rests in a drain or trough for recirculating nutrient solution, or fits into a lower pipe. A pump moves nutrient solution from a nutrient solution reservoir to the mister or irrigation pipe at the top of the grow tube 12, where the nutrient solution is emitted and allowed to drip down through the media 18 and plant roots. Some of the nutrient solution trickles down the walls of the pipe 12 and is captured by roots in contact with the pipe wall. Excess nutrient solution drains to the bottom of the pipe 12 where it is drained back to the nutrient solution reservoir. High humidity is maintained within the grow tube due to the constant trickling/misting of nutrient solution. The height of the plant grow tube 12 is variable dependent on greenhouse height, and the spacing for plants is variable dependent on plant type and desired spacing. It is possible to stack grow tubes 12 on top of each other to vary height, by fitting the bottoms of the grow tubes 12 with coupling caps, to utilize conveyor production techniques.

The grow tubes 12 of the vertical hydroponic plant production apparatus 10 of the present invention can be fixed in place using hangers, rope, or strap and metal hooks that loop over a support beam or bracket and secure to the grow tube 12 or tower through holes 30 drilled at the first end of the grow tube 12. The holes 30 can be of variable size and placement depending on application, although in the most common embodiment, there are four holes 30, one pair centered on either side of the housing upper, and one pair forward (towards the front of the grow tube 12) of the centered pair allowing slight inclination of the hanging tower 12 if inclined growing is desired. The grow tubes 12 can also be fixed in place using a series of holes or a gap cut in the grow tube 12 allowing the grow tube to be fixed to a pole having a bracket or pressure or spring action hanging system attached to it. The grow tube 12 can also be inclined on said pole or hanging system for the purpose of inclined production.

The grow tube 12 of the vertical hydroponic plant production apparatus 10 of the present invention can also be secured to a support pole utilizing a system of metal brackets whereas one bracket type is female and is designated as an "H" bracket 32 and the other bracket type is male and is designated as a "Z" bracket 34. The female "H" bracket 32 has a receiving portion and an anchoring portion to bolt to the back or side of the tower 12. The male "Z" bracket 34 consists of a vertical, upward facing tongue portion that fits into the receiving portion of the female bracket 32, and has a hole 36 through the middle, angled portion of the bracket 34 which fits over a support pole. The rear, downward facing vertical portion of the bracket 34 has a hole 38 drilled midway across the bottom of the bracket 34 and is threaded to receive a bolt. As weight is applied to the tongue portion of the bracket 34 through the placement of a bracketed tower, downward torque is applied across the "Z" bracket 34 causing a clutch action to affix the bracket tightly to the support pole. The torque attachment of this "Z" bracket 34 can be enhanced by tightening the bolt threaded into the rear of the bracket 34 against the support pole, applying even more pressure for bracket attachment.

The media insert 18 of the vertical hydroponic plant production apparatus 10 of the present invention can also be altered in several ways to serve a diverse range of functions. The media 18 can be cut at a taper from the unfastened or unfolded end to the fastened or folded end, reserving a tapered space at the rear of the insert to allow compost, alternate plant media, fertilizing substance or some type of soil amendment or additive to be held in the space between the tapered media insert and the rear and sidewalls of the tower housing 12. This alteration allows compost based hydroponic plant production using regular irrigation water, with plant nutrients supplied by the compost or other additive. Tops, sides, and corners of the media insert 18 can also be cut, rounded, or cut at an angle to reduce biosolids accumulation, algal growth, or to enhance water distribution through the media 18, depending on application. Multiple inserts 18 can also be used in towers 12 allowing multiple age groups of plants to incorporated into each grow tube 12. Worms are also commonly integrated into the grow tubes 12 and the media is designed to have the correct mesh size to accommodate their movement through the media 18, although media 18 with a smaller or larger mesh size may be used depending on application.

The vertical hydroponic plant production apparatus 10 of the present invention is comparatively lightweight, inexpensive to manufacture (being based on common PVC extrusion techniques) and existing polyethylene matrix material production, will not clog with nutrient solution, and requires much less labor to operate. The present invention can also be converted to more traditional horizontal production techniques if desired, eliminating the risk inherent in changing production techniques for commercial producers.

In addition, traditional nitrogen and phosphorus removal techniques in aquaculture are very poor compared to removal using plant uptake for phytoremediation. Plants are able to remove N and P to levels an order of magnitude lower than any mechanical/chemical/microbial technique currently in use. The present invention phytoremediates water allowing for prolonged water use/recirculation and water conservation.

The vertical hydroponic plant production apparatus 10 of the present invention is an improvement on traditional harvesting and sales models where production systems are physically removed from the sales systems and shipping and handling results in a large percentage of producer losses, both financially as wasted or expired produce. By selling live plants, there is no spoilage and shipping and handling is done partially by producers moving towers to market places, but primarily by consumers who are interested in fresh produce and the experience of picking and harvesting vegetables, herbs and greens for their own use. The grow tubes are easily transported and easy to stack, lift, and slide onto shelves. They essentially operate as a packaging system as well as a plant production system. Further, by utilizing individual towers, landscape designers and home users can scale their display or production system exactly to their specifications.

The vertical hydroponic plant production apparatus 10 of the present invention reduces necessary growing space tremendously. Typical reductions in growing space utilizing a vertical aeroponic technique have varied between 60% and 85% compared to conventional growth methods. Greenhouse growing space is very expensive, so the ability to increase crop size without increasing greenhouse space could prove very profitable. The present invention is also very affordable to manufacture, building on existing PVC pipe production infrastructure. Implementation of the present invention will also be simple, building on current hydroponic production technology.

The increased water recirculation time achieved with the vertical hydroponic plant production apparatus 10 of the present invention can eliminate one of the high costs and reduce the negative environmental effects of aquaculture, resulting in increased profits and a better industry image for aquacultural producers. Using the present invention can also allow aquacultural producers to diversify their product base and/or grow supplementary feed products (depending on the dietary needs of the fish).

The vertical hydroponic plant production apparatus 10 of the present invention has the potential to open up an entirely new system of production, transportation, shipping, handling, and display to vegetable producers, retailers, and consumers. This can result in fresher produce, a more pleasant customer shopping experience, reduced waste, reduced handling and packaging costs, fewer food miles, less plastic and packaging material consumption, and longer shelf life of purchased produce.

The vertical hydroponic plant production apparatus 10 of the present invention can be used by industrial institutions for phytoremediation of waste waters, using the towers as trickling, plant integrated filters for the removal of waste materials, and the remediation of waste waters for discharge.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

The invention claimed is:

1. A hydroponic plant growth system, the system comprising:
   a plurality of hollow grow tubes positioned adjacent to each other;
   wherein each said grow tube has a front face, a back face, a right face, a left face opposing said right face, a first end, and an open second end opposing said first end, wherein each grow tube has a length between the first end and the open second end and the front face has a width, and wherein the length of each grow tube is larger than the width of the front face; and
   wherein each grow tube has a slot formed in the front face, and wherein said slot is formed along the entire length of said front face of each grow tube from the first end to the second end or to a point approximately four (4") inches to approximately six (6") inches from the first end of each grow tube, wherein the entire length of the slot has a width ⅓ to ½ the width of the front face; and
   one or more matrix media inserts, wherein each matrix media insert is composed of two halves and are formed of a plastic, fibrous, non-woven matrix media material and wherein the media material is coated in a binding material to slow decomposition and reducing UV damage, wherein said one or more matrix media inserts are insertable into each of the grow tubes; and
   wherein said plurality of grow tubes are adapted to each receive said one or more matrix media inserts;
   wherein the first end of each grow tube is configured to be positioned vertically higher than the open second end; and
   wherein said grow tube allows plants to be inserted between said two halves of said one or more matrix media inserts through said slot; and
   at least one pump;
   one or more nutrient solution conduits, wherein said at least one pump is operably coupled to said one or more nutrient solution conduits;
   one or more nutrient solution emitters, wherein said one or more nutrient solution emitters are operable coupled to said one or more nutrient solution conduits; and
   at least one reservoir, wherein said at least one pump is capable of circulating nutrient solutions from said at least one reservoir to the first end of the plurality of grow tubes through said one or more nutrient solution conduits and emitting said nutrient solution from said one or more nutrient solution emitters into the first end of each of the plurality of grow tubes such that said nutrient solution passes through the media matrix inserts and into the reservoir through the open second end of each of the plurality of grow tubes.

2. The hydroponic plant growth system of claim 1, wherein said slot of each grow tube has a width of approximately 1.5 inches.

3. The hydroponic plant growth system of claim 1, wherein the second end of each of the grow tubes is configured to be positioned to allow said nutrient solution to drain from the plurality of grow tubes into said at least one reservoir.

4. The hydroponic plant growth system of claim 1, wherein the two halves of each of the matrix media inserts are contacting each other when placed inside each of the grow tubes.

5. The hydroponic plant growth system of claim 1, wherein each of the two halves of the matrix media inserts is approximately two inches thick.

6. The hydroponic plant growth system of claim 1, wherein the two halves of said one or more matrix media inserts has a width, wherein a combined width of the two halves of the matrix media inserts are approximately the internal width of the grow tube.

7. The hydroponic plant growth system of claim 1, wherein each side of the grow tube is approximately four inches to six inches wide.

8. The hydroponic plant growth system of claim 7, wherein the width of the front face, back face, right face, and left face of each grow tube is approximately four inches.

9. The hydroponic plant growth system of claim 1, wherein the matrix media inserts are supported only by the grow tube.

10. The hydroponic plant growth system of claim 1, wherein said binding material coating said matrix media inserts is a silicone binder.

11. The hydroponic plant growth system of claim 1, wherein the slot extends substantially the length of the grow tube.

12. The hydroponic plant growth system of claim 1, wherein the slot extends along the entire length of the grow tube.

13. The hydroponic plant growth system of claim 1, wherein the grow tube is configured to be supported in a substantially vertical position.

14. A method of growing a plant in a vertical hydroponic plant growth system, the method comprising:
   providing a plurality of hollow grow tubes positioned adjacent to each other;
   wherein each grow tube has a front face, a back face, a right face, a left face opposing said right face, a first end, and an open second end opposing said first end, wherein each grow tube has a length between the first end and the open second end and the front face has a width, and wherein the length of each grow tube is large than the width of the front face; and
   wherein each grow tube has a slot formed in the front face, and wherein said slot is formed along the entire face of the grow tube from the first end to the second end, or to a point approximately four (4") inches to approximately six (6") inches from the first end of the grow tube, wherein the entire length of the slot has a width ⅓ to ½ the width of the front face;
   providing one or more matrix media inserts per grow tube, wherein each matrix media insert is composed of two halves, wherein said one or more matrix media inserts are insertable into each of the plurality of grow tubes;
   wherein said plurality of grow tubes are adapted to each receive said one or more matrix media inserts; and
   wherein said one or more matrix media inserts are composed of a plastic, fibrous, non-woven matrix media material and wherein the media material is coated in a binding material to slow decomposition and reducing UV damage;
   wherein said grow tube allows one or more plants to be inserted between two of the matrix media inserts through said slot; and
   providing at least one pump;
   providing one or more nutrient solution conduits, wherein said at least one pump is operably coupled to said one or more nutrient solution conduits;
   providing one or more nutrient solution emitters, wherein said one or more nutrient solution emitters are operably coupled to said one or more nutrient solution conduits;

and
providing at least one reservoir, wherein said at least one pump is capable of circulating nutrient solutions from said at least one reservoir to the first end of the plurality of grow tubes through said one or more nutrient solution conduits and emitting said nutrient solution from said one or more nutrient solution emitters into the first end of each of the plurality of grow tubes such that said nutrient solution passes through the media matrix inserts and into the reservoir through the open second end of each of the plurality of grow tubes;

inserting one or more plants through said slot and between said two halves of said one or more matrix media inserts; and growing said one or more plants.

15. The method of claim 14, wherein said slot of each grow tube has a width of approximately 1.5 inches.

16. The method of claim 14, wherein the matrix media inserts are supported only by the grow tube.

17. The method of claim 14, wherein the matrix media inserts are composed of two halves contacting each other when inserted into the grow tube.

18. The method of claim 17, wherein each half of the matrix media inserts is approximately two inches thick.

19. The method of claim 14, wherein the two halves of said one or more matrix media inserts has a width, wherein a combined width of the two halves of the matrix media inserts are approximately the internal width of the grow tube.

20. The method of claim 14, wherein each side of the grow tube is approximately four inches to six inches wide.

21. The method of claim 14, wherein the width of each side of the grow tube is approximately four inches.

22. The method of claim 14, wherein the matrix media inserts are supported only by the grow tube to maintain a vertical orientation.

23. A hydroponic plant growth system, the system comprising:

a plurality of vertical or substantially vertical hollow grow tubes positioned adjacent to each other;

wherein each grow tube has a front face, a back face, a right face, a left face opposing said right face, a first end, and an open second end opposing said first end;

and wherein each grow tube has a slot formed in the front face, wherein said slot is formed along the entire length of the front face of the grow tube; and wherein the entire length of the slot has a width ⅓ to ½ the width of the front face;

a plurality of matrix media inserts, wherein two or more of said plurality of said matrix media inserts are insertable into each of the grow tubes; and wherein said plurality of grow tubes are adapted to each receive said two or more matrix media inserts; and wherein said two or more matrix media inserts are composed of a plastic, fibrous, non-woven matrix media material and wherein the media material is coated in a binding material to slow decomposition and reducing UV damage;

wherein each grow tube allows plants to be inserted between two of the two or more matrix media inserts through said slot; and at least one pump;

one or more nutrient solution conduits, wherein said at least one pump is operably coupled to said one or more nutrient solution conduits;

one or more nutrient solution emitters, wherein said one or more nutrient solution emitters are operably coupled to said one or more nutrient solution conduits; and at least one reservoir, wherein said at least one pump is capable of circulating nutrient solutions from said at least one reservoir to the first end of the plurality of grow tubes through said one or more nutrient solution conduits and emitting said nutrient solution from said one or more nutrient solution emitters into the first end of each of the plurality of grow tubes such that said nutrient solution passes through the media matrix inserts and into the reservoir through the open second end of each of the plurality of grow tubes.

24. The system of claim 23, wherein said slot has a width of approximately 1.5 inches.

25. The system of claim 23, wherein the matrix media inserts are supported only by the grow tube.

26. The system of claim 23, wherein the width of the front face, back face, right face, and left face of each grow tube is between approximately four inches and six inches.

27. The system of claim 23, wherein the matrix media inserts are composed of two halves contacting each other when inserted into the grow tube.

* * * * *